(12) United States Patent
Antonelli et al.

(10) Patent No.: US 7,004,512 B2
(45) Date of Patent: Feb. 28, 2006

(54) INDENTED APEX V-RETAINER COUPLING WITH CUSHION

(75) Inventors: Nicola A. Antonelli, North Royalton, OH (US); John F. Fritskey, Strongsville, OH (US); James M. Orzech, Twinsburg, OH (US)

(73) Assignee: Voss Industries, Inc., Cleveland, OH (US)

( * ) Notice: Subject to any disclaimer, the term of this patent is extended or adjusted under 35 U.S.C. 154(b) by 78 days.

(21) Appl. No.: 10/374,408

(22) Filed: Feb. 26, 2003

(65) Prior Publication Data

US 2003/0234539 A1   Dec. 25, 2003

Related U.S. Application Data

(60) Provisional application No. 60/388,607, filed on Jun. 19, 2002.

(51) Int. Cl.
  *F16L 23/00*   (2006.01)
(52) U.S. Cl. ............... 285/365; 285/364; 285/406; 285/407; 285/408; 285/409; 285/420
(58) Field of Classification Search ......... 285/364, 285/365, 406, 407, 408, 409, 424, 420
  See application file for complete search history.

(56) References Cited

U.S. PATENT DOCUMENTS

| | | | | |
|---|---|---|---|---|
| 184,599 A | * | 11/1876 | Ehrhardt | 24/456 |
| 817,300 A | | 4/1906 | David | |
| 1,190,350 A | * | 7/1916 | Williams | 405/121 |
| 1,497,549 A | * | 6/1924 | Conradi | 285/373 |
| 2,041,132 A | * | 5/1936 | Johnson | 285/112 |
| 2,201,372 A | | 5/1940 | Miller | |
| 2,219,161 A | * | 10/1940 | Jacobs | 285/365 |
| 2,225,208 A | | 12/1940 | Crickmer | |
| 2,775,806 A | | 1/1957 | Love | |
| 2,793,883 A | | 5/1957 | Main, Jr. | |
| 2,956,820 A | | 10/1960 | De Cenzo | |
| 3,116,078 A | | 12/1963 | Scherer | |
| 3,233,907 A | * | 2/1966 | Stanton | 277/616 |
| 3,376,055 A | * | 4/1968 | Donroe | 285/236 |
| 3,432,189 A | | 3/1969 | Buller | |
| 3,498,649 A | * | 3/1970 | Pfeuffer | 285/365 |
| 3,655,223 A | * | 4/1972 | Johnson | 285/39 |
| 3,724,878 A | | 4/1973 | Ford | |
| 3,791,681 A | * | 2/1974 | Moldow | 285/233 |
| 4,222,155 A | * | 9/1980 | Oetiker | 24/20 R |
| 4,316,053 A | | 2/1982 | Rieffle | |
| 4,627,645 A | * | 12/1986 | Sauer | 285/39 |
| 4,627,646 A | * | 12/1986 | Kessel | 285/114 |
| 4,640,536 A | * | 2/1987 | Printiss et al. | 285/367 |
| 4,664,428 A | * | 5/1987 | Bridges | 285/373 |
| 4,726,611 A | * | 2/1988 | Sauer | 285/110 |
| 4,729,582 A | * | 3/1988 | Zeidler | 285/104 |

(Continued)

FOREIGN PATENT DOCUMENTS

EP   0 278 586   8/1988

(Continued)

*Primary Examiner*—James M. Hewitt
(74) *Attorney, Agent, or Firm*—Fay, Sharpe, Fagan, Minnich & McKee, LLP (57) ABSTRACT

A pipe coupling includes a first lateral wall, a second lateral wall and an apex wall spanning and connecting the first lateral wall to the second lateral wall. The apex wall includes an outer surface and an inner surface. A gasket is disposed on the inner surface of the apex wall. A groove is located on the apex wall.

11 Claims, 7 Drawing Sheets

U.S. PATENT DOCUMENTS

| | | | |
|---|---|---|---|
| 4,842,306 A * | 6/1989 | Zeidler et al. | 285/104 |
| 4,924,913 A * | 5/1990 | Pedersen | 138/155 |
| 4,995,648 A * | 2/1991 | Jackson | 285/406 |
| 5,161,836 A * | 11/1992 | McKinnon | 285/373 |
| 5,249,829 A * | 10/1993 | Hendrickson | 285/112 |
| 5,280,970 A | 1/1994 | Straub | |
| 5,454,606 A | 10/1995 | Voss et al. | |
| 5,722,666 A * | 3/1998 | Sisk | 277/615 |
| 5,769,467 A | 6/1998 | Bridges | |
| 6,041,824 A * | 3/2000 | Powell | 138/109 |
| 6,109,665 A * | 8/2000 | Meinig | 285/405 |
| 6,328,352 B1 | 12/2001 | Geppert et al. | |

FOREIGN PATENT DOCUMENTS

| | | | |
|---|---|---|---|
| EP | 616162 A1 * | 9/1994 | |
| GB | 1104922 | 3/1968 | |
| GB | 1 472 750 | 5/1977 | |

* cited by examiner

INDENTED APEX V-RETAINER COUPLING WITH CUSHION

This application claims the benefit of U.S. Provisional Patent Application No. 60/388,607, filed Jun. 19, 2002.

FIELD OF THE INVENTION

The present invention relates to couplings for joining pipe ends and sealing the joint between the pipe ends. More particularly, the invention relates to joining sheet metal ducts that have rolled beads that act as flanges.

BACKGROUND OF THE INVENTION

Sheet metal ducts or pipes having rolled beads at their ends are used in various industries, primarily for exhaust collection. The joining and sealing of pipe or duct joints is a critical concern. Proper sealing has become more important as efforts have increased to protect the environment. Liquid chemicals, mists, fumes, food and other materials, such as fine dust, must be conducted through pipelines without leakage of the material from the pipeline and without contamination from outside entering the pipeline. To seal the ends of a pipe or metal duct having rolled beads, installers typically have used a standard V-retainer coupling, the apex of the V-retainer coupling being flat.

For a good seal with a narrow coupling, the tolerances are low. A coupling having a flat apex wall requires an installer to estimate the midpoint of any cushion or gasket material in the coupling so that the midpoint of the gasket material is placed at the circumferential point of contact of the two pipe ends so that as much surface area of the cushion as possible is located on both sides of the pipe ends. Furthermore, a flat apex fails to urge the cushion towards the gap that is left between the two abutting edges of the pipes.

Accordingly there is a need for a coupling for joints between pipes having flanged ends, and more particularly, rolled beads at their ends where the coupling provides a superior seal and an aligning feature that facilitates assembly of the pipeline in field installations.

SUMMARY OF THE INVENTION

According to the present invention, a new and improved coupling assembly is provided. According to one embodiment of the invention a coupling assembly for joining two pipe ends wherein each pipe end has a rolled bead at its end is provided. Describing the coupling assembly with relation to the environment in which it is used, the assembly includes an apex wall adjacent a rolled bead end of a first pipe and a rolled bead end of a second pipe when the rolled bead ends of the pipes have been abutted against one another to define a joint between them. The apex wall includes a protrusion on a lower surface that fits at least partially into a gap adjacent the joint. A first lateral wall depends from the apex wall. The first lateral wall is situated substantially parallel to a terminal portion of the rolled bead end of the second associated pipe. A cushion is situated on the lower surface of the apex wall. The cushion at least partially fills the gap between the pipes.

According to another aspect of the present invention a pipe coupling for joining two pipe ends is provided. The pipe coupling includes a first lateral wall, a second lateral wall and an apex wall spanning and connecting the first lateral wall to the second lateral wall. The apex wall includes an outer surface and an inner surface. A gasket is disposed proximal the inner surface of the apex wall. An aligning member is located on the apex wall.

According to yet another embodiment of the present invention, a method for joining a first pipe having a flanged end to a second pipe having a flanged end is provided. The method includes abutting a flanged end of a first pipe against a flanged end of a second pipe such that a joint exists between the flanged ends. The method also includes placing a coupling assembly over both of the flanged ends. The coupling assembly includes an apex wall having an inwardly directed protrusion and a cushion disposed on an underside of the apex wall. The method further includes aligning the protrusion of the coupling assembly with the joint between the flanged ends. The method also includes tightening the coupling assembly around the flanged ends such that the peripheral groove urges the cushion into the joint.

According to another embodiment of the invention a circumferentially contractible pipe coupling assembly is provided. The assembly includes a coupling element having approximately V-shaped cross-section and a base wall. The coupling element includes a first end and a second end that are spaced from each other in a first position of the coupling element and are brought adjacent each other in a second position of the coupling element. A latch selectively moves the coupling element from the first position to the second position. A cushion is located on the base wall. An aligning member extends circumferentially on the base wall.

The advantages and benefits of the present invention will become apparent to those of ordinary skill in the art upon reading and understanding the following detailed description of the preferred embodiments.

BRIEF DESCRIPTION OF THE DRAWINGS

This invention may take form in certain components and structures, several preferred embodiments of which will be illustrated in the accompanying drawings wherein.

DETAILED DESCRIPTION OF THE DRAWINGS

It is to be understood that the specific devices and processes illustrated in the attached drawings, and described in the following specification are simply exemplary embodiments of the inventive concepts. Hence, specific examples and characteristics relating to the several embodiments disclosed herein are not to be considered as limiting.

Figure 1:
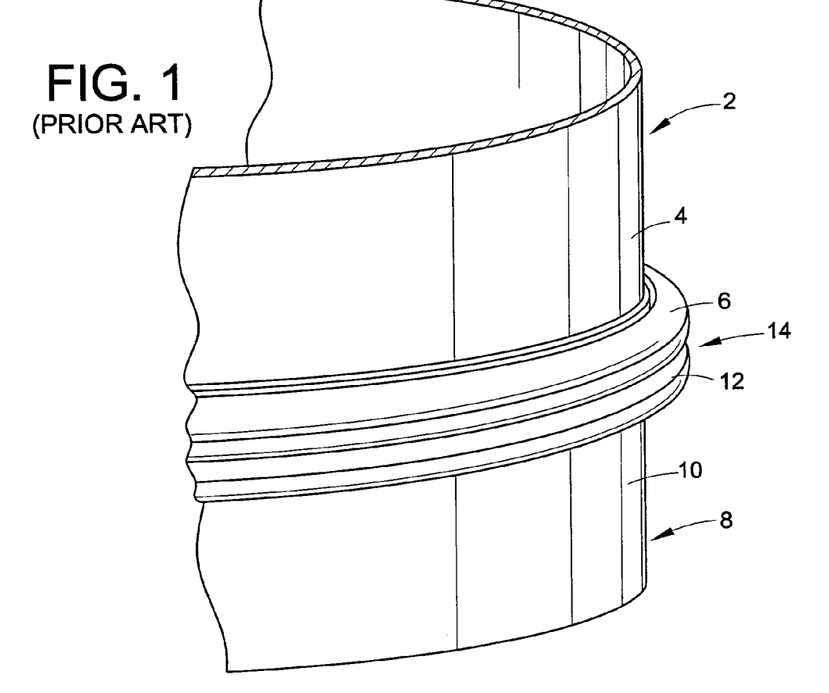
FIG. 1 is a perspective view of the rolled beaded ends of two conventional pipe sections abutted together.

FIG. 1 illustrates a pipe joint between adjacent pipe ends of sheet metal ducts. This illustration is to provide the environment in which the coupling assembly can be used, however it is not meant to limit the coupling assembly to joining only pipes that have rolled bead ends. On the contrary, the coupling assembly can be used to join many different types of ducts together. For ease of illustration only, one possible environment is provided. A first pipe 2 has at a first end 4 a rolled bead 6. A second pipe 8 has at a first end 10 a rolled bead 12. The circumferential joint between the two pipes 2 and 8 is identified by reference numeral 14. Such pipes are used in industrial plants, such as furniture manufacturing for removing sawdust, or CNC machines for removing chemical mist from adjacent a work surface.

Figure 2:
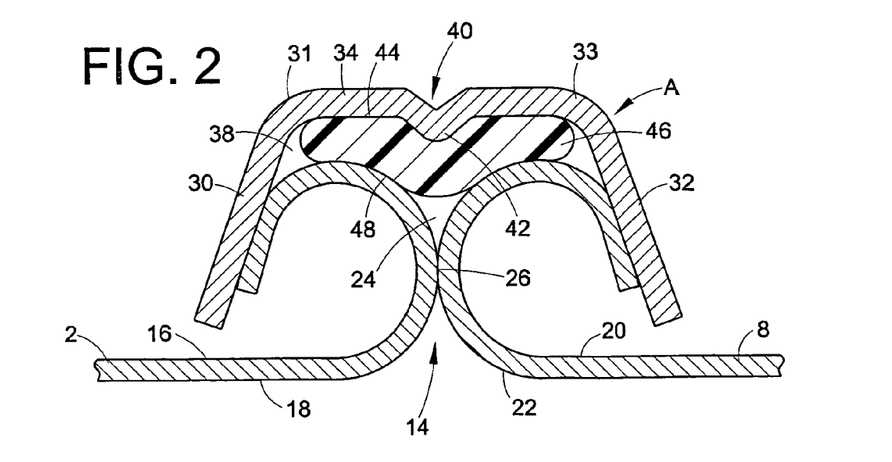
FIG. 2 is a schematic cross-sectional view of a coupling according to a first embodiment of the present invention mounted on the pipe ends of FIG. 1.

Referring to FIG. 2, the first pipe 2 includes an outer surface 16 and an inner surface 18. The second pipe 8 also includes an outer surface 20 and an inner surface 22. The rolled bead 6 of the first pipe 2 is formed by rolling the inner surface 18 over the outer surface 16 to form the curvilinear shaped rolled bead. The rolled bead 12 is formed by rolling the inner surface 22 over the outer surface 20 in much the same fashion. A gap 24 forms near the joint 14 when the rolled bead 6 of the first pipe 2 abuts the rolled bead 12 of the second pipe 8 and the coupling A is mounted over the rolled beads to join the pipes. Desirably, a contact point 26 is formed between the first pipe rolled bead 6 and the second pipe rolled bead 12 around the circumference of each pipe. Nevertheless, the contact point 26 may not exist at every cross-section of the pipe due to such things as manufacturing tolerances.

A coupling assembly A joins the two pipe ends together. The coupling assembly A includes a first lateral wall 30, a second lateral wall 32 and a base wall or an apex wall 34 spanning the lateral walls and connecting them to each other to form a unitary structure. The lateral walls 30, 32 depend from the apex wall 34 at an obtuse angle. The angle at which the lateral walls 30, 32 depend from the apex wall 34 is determined by the dimensions of the rolled beads 6, 12 on the pipes. It is apparent from FIG. 2 that a plane of the apex wall 34 is substantially parallel to a plane of the pipes 2, 8 when the coupling is mounted on the pipes. A plane of the lateral walls 20, 22 is substantially parallel to a plane of the terminal ends of the beads 6, 12 respectively. As is apparent from FIG. 2, the coupling assembly A has a generally V-shaped or even W-shaped configuration in cross-section.

The apex wall 34 and the two lateral side walls 30 and 32 define a channel 38. The apex wall 34 includes a groove 40 centrally located between the lateral walls 30 and 32 on the apex wall. The groove extends along the apex wall 34 circumferentially around the coupling and into the channel 38. The groove depicted in FIG. 2 is V-shaped in cross section, however the groove may take other shapes and forms such as, but not limited to square shaped or rounded. Furthermore, the depth of the groove may vary along the circumference of the coupling.

The groove 40 results in a rib or protrusion 42 on an inner surface 44 of the apex wall. The groove 40 extends in the same general direction as do the two lateral walls 30, 32. The rib or protrusion 42 also serves as an aligning device for aiding in the joining of the ducts 2 and 8 in field installations. While the rib 42 is illustrated as being shaped, like an inverted V, matching the shape of the groove, it should be appreciated that the rib could have any desired shape, such as a rectangle or the like. Use of the rib as an aligning device will be described in more detail below. Since the groove 40 can vary in depth about the circumference of the coupling, it follows that the height of the rib 42 may vary. Likewise, the rib can be discontinuous resulting in a plurality of protrusions about the circumference of the coupling, as will be discussed below.

A gasket or cushion 46 is attached to a coupling inner surface 44 by a conventional adhesive or in another known fashion. The cushion has a lower surface 48. The cushion 46 can span a substantial portion of the cross section of the apex wall 34 as shown in FIG. 2. The cushion at least partially fills the channel 38 defined by the walls 30, 32 and 34 of the assembly A.

The rib 42 urges the cushion 46 towards the joint 14 between the abutting pipe ends. The cushion 46 is provided to seal the joint 14. The rib 42 urges the cushion 46 towards the contact point 26 of the joint 14 so that lower surface 48 contacts as large an area of the first pipe inner surface 18 and the second pipe inner surface 22 of the rolled bead ends 6 and 12 as possible. The interface between the lower surface 48 of the cushion 46 and the inner surfaces 18, 22 of the pipes 2, 8 forms a seal between the surfaces. In some installations the two pipes abutting one another may not contact each other at all points along the circumference of the pipes, however the cushion 46 is still urged toward the gap 24 to fill at least part of the gap 24 and seal the joint 14 between the pipes.

The cushion 46 is urged downwardly toward the joint 14 by tightening of the coupling assembly A, which moves the groove 40 downward, which urges the cushion downwardly into the joint 14. This can result in the cushion 46 pushing the rolled beads 6 and 12 away from one another, thus enlarging the gap 24. The lateral walls 30 and 32 counteract the lateral force imposed by the cushion 46 on the rolled beads 6 and 12 to restrict the lateral movement of the rolled beads. As is apparent in FIG. 2 the tighter the coupling assembly is clamped around the rolled bead ends 6 and 12, the closer the apex wall 34 moves towards the tops of the rolled beads. This necessarily results in intersections 31 and 33 between the lateral walls 30 and 32 and the apex wall 34 moving closer toward the tops of the rolled beads 6 and 12. Even though the cushion may generate a greater lateral force on the rolled bead ends 6 and 12 as more of the cushion 46 is forced into the gap 24, the lateral force imparted upon the lateral walls 30 and 32 is at a distance closer to the intersections 31 and 33 of the lateral walls 30 and 32 with the apex wall 34. Accordingly, a greater amount of force may be acting upon the lateral wall, but it is closer to the intersection (i.e. axis of rotation) and thus the amount of torque acting on intersection has not significantly increased.

The apex wall 34 and the lateral side walls 30, 32 are usually manufactured from a single piece of metal. Metal is preferred so that the coupling can be easily formed, but the coupling assembly can be made from another material such as plastic or a combination of metal and plastic or another formable material. The metal can be a corrosion resistant stainless steel or galvanized steel. The metal can also be aluminum and the coupling can be extruded.

The cushion or gasket is made of conventional elastomeric material that is resilient enough to deform somewhat as dictated by the shape of the pipe rolled beads as a coupling handle is closed to clamp the coupling around the pipe ends and thus provide a seal between them. Suitable materials for the cushion include, but are not limited to, open cell and closed cell PVC foams. The cushion can be secured to the apex wall via a self-adhesive backing (not shown) or in any other conventional manner. Furthermore, the cushion need not be secured to the apex wall. A strip of cushioning material of suitable length could simply be placed adjacent the underside of the apex wall.

Figure 3:
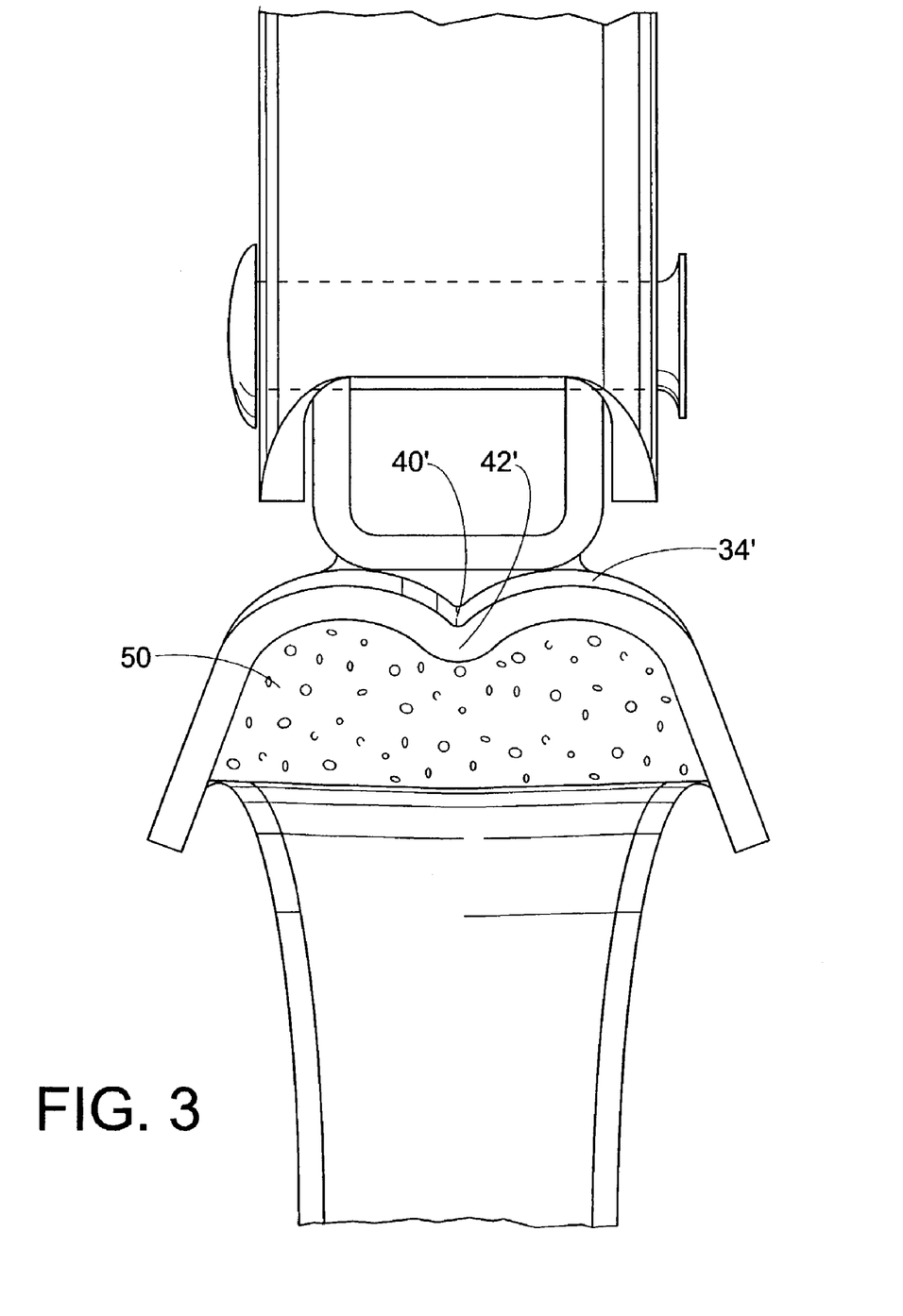
FIG. 3 is an end elevational view of a coupling according to a second embodiment of the present invention.

An alternate embodiment of the coupling assembly A is shown in FIG. 3. For ease of illustration and comprehension of this alternative, like components are identified with like numerals with a primed suffix (') and new components are identified by new numerals. In this embodiment, a cushion 50 spans the entire cross-section of the coupling underneath the apex wall 34'. FIG. 3 also further illustrates the groove 40' and a rib 42' located on an apex wall 34' of the coupling, as well as a connection between the ends of the coupling assembly A, which will be described in more detail below.

Figure 4:
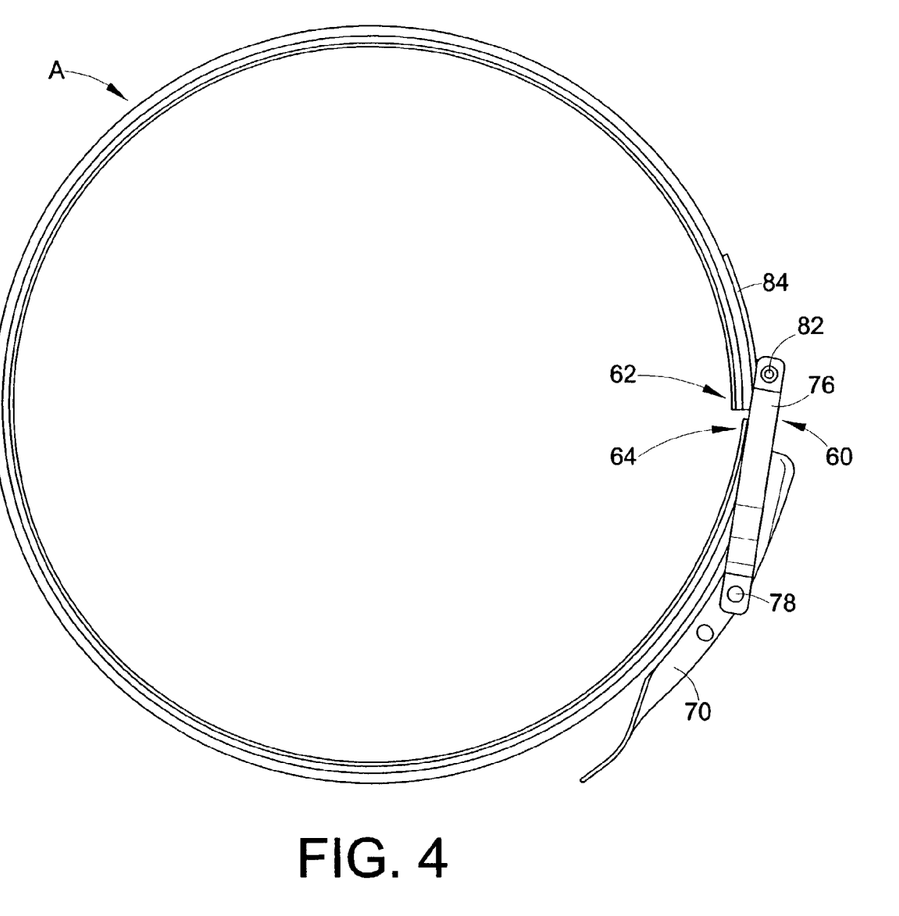
FIG. 4 is a top plan view of a coupling with an over-center handle having side plates, according to FIG. 2 of the present invention.
Figure 5:
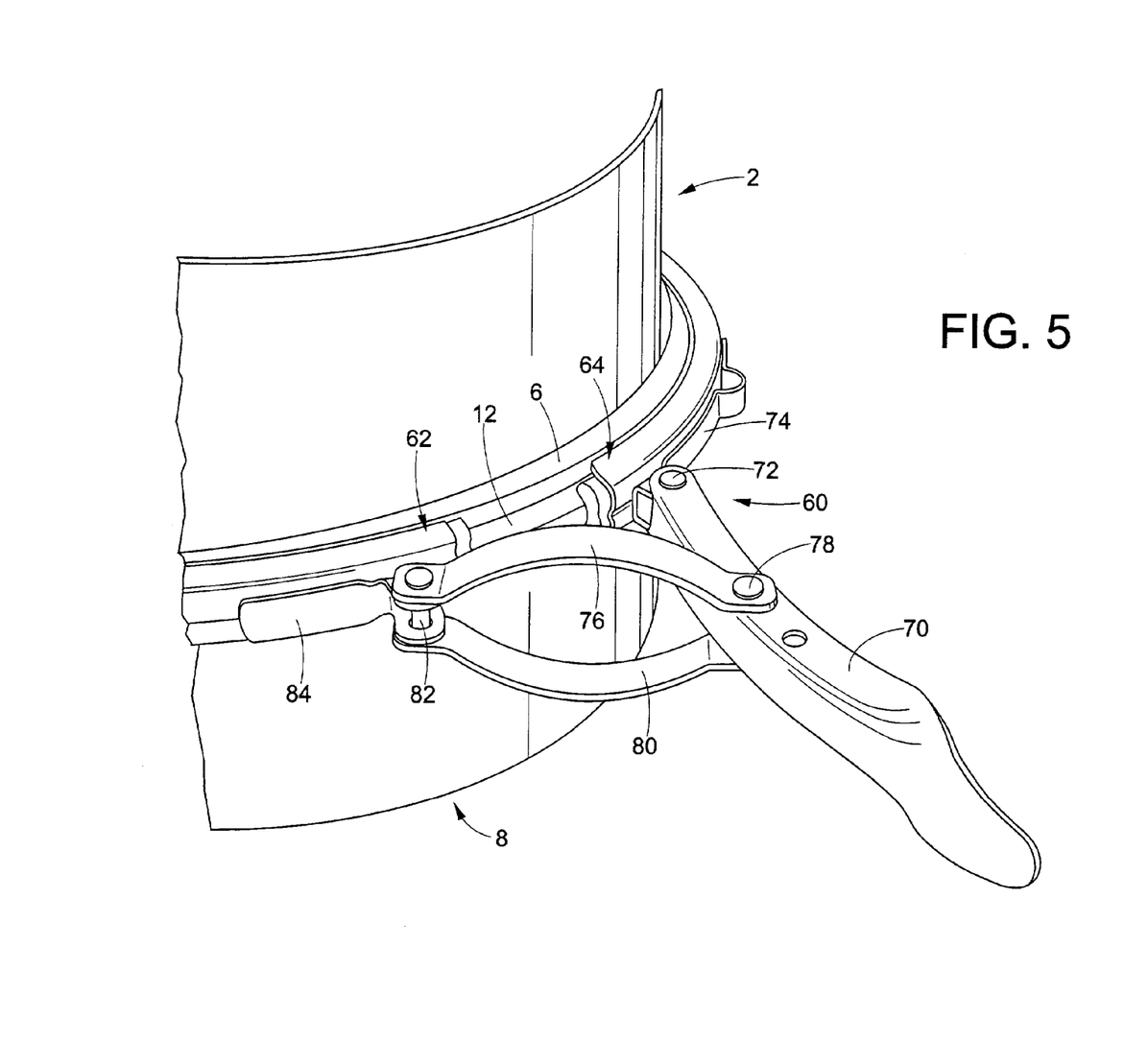
FIG. 5 is an enlarged perspective view of a portion of the coupling of FIG. 4 mounted over the ends of two pipe sections with the handle in an unlatched position.

FIG. 4 illustrates the coupling A having a handle or latch mechanism 60. More particularly, the handle can be an over center handle. The coupling A is substantially circular having a diameter to match the ends of the pipes that it will join together. An open over-center handle allows the coupling to have a larger diameter than the pipe end to which it will mount. Referring to FIGS. 4 and 5, the handle or latch mechanism 60 draws a first end 62 of the coupling assembly A towards a second end 64 of the coupling assembly. As seen in FIG. 4, when the latch or handle 60 is closed the ends 62, 64 are drawn together into a closed position. As seen in FIG. 5, when the latch is open the ends are displaced from one another in an open position.

With reference to FIG. 5, the handle mechanism 60 includes a bar 70 that is hingedly fastened to the second end 64 of the coupling assembly A via a pin 72. The pin 72 is held to the second end 64 via a retainer 74. The handle mechanism further includes a first side plate 76 pivotally attached to the bar 70 via a pin 78 and a second side plate 80 (only visible in FIG. 5) attached to the bar 70 via the pin 78. The second side plate 80 can be attached via its own pin, as opposed to sharing a pin with the first side plate 76. Each of the side plates 76, 80 attach to the first end 62 via pin 82. The pin 82 is held to the first end 62 via retainer 84. Alternatively, each side plate could also attach to the first end 62 with each its own pin.

FIG. 5 illustrates the first pipe 2 abutted against the second pipe 8 where the beaded ends 6, 12 are surrounded by the coupling A. The latch or handle 60 is open so that the diameter of the coupling A is slightly larger than the pipe ends 6, 12. The handle 60 closes to reduce the diameter of the coupling to clamp around the pipe ends. To close the handle, the bar 70 is urged toward the retainer 74.

Figure 6:
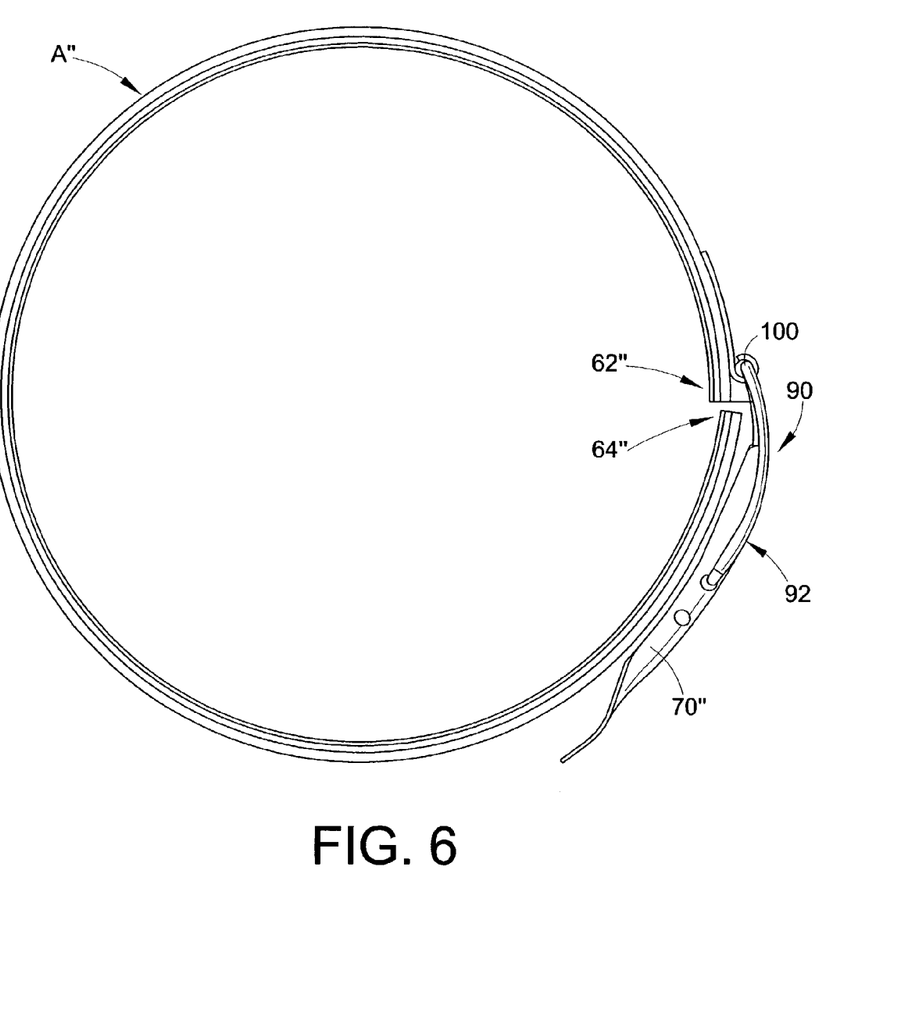
FIG. 6 is a top plan view of a coupling with an over-center handle having a spring, according to a second embodiment of the present invention.
Figure 7:
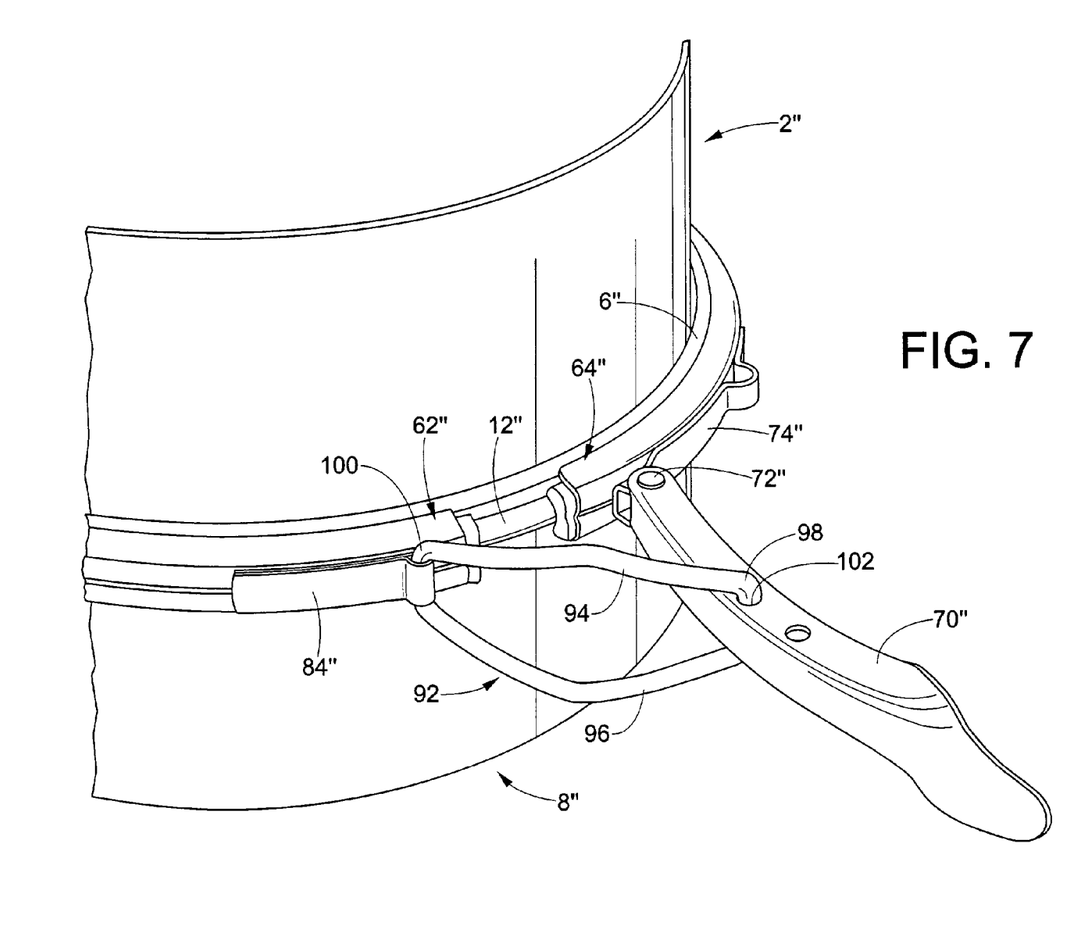
FIG. 7 is an enlarged perspective view of a portion of the coupling of FIG. 6 mounted over the ends of two pipe sections with the handle in an unlatched position.

FIGS. 6 and 7 illustrate another embodiment of a coupling A" having an alternate type of latch or handle 90. For ease of illustration and comprehension of this alternative, like components are identified with like numerals having a double primed (") suffix and new components are identified by new numerals. FIG. 7 illustrates the first pipe 2" and its rolled end 6" and the second pipe 8" and its rolled end 12" where the ends are surrounded by the coupling A" having an over-center handle 90 with a spring 92 in the open handle position.

The handle 90 of this embodiment includes a bar 70" that is hingedly fastened to a second end 64" of the coupling A" via a pin 72". The pin 72" is held near the second end 64" by a retainer 74". The handle 90 includes the spring 92 having a first side member 94 and a second side member 96 connected by a first portion 98 that attaches to the bar 70" and a second portion 100 that attaches to a first end 62" of the coupling A". The first portion 98 is received inside an opening 102 in the bar 70", similar to the pin 78. Similarly, the second portion 100 is retained on a retainer 84" near the first end 62" of the coupling A". The handle 90 closes in a similar manner as the handle mechanism 60 described above to draw the first end 62" of the coupling assembly A" toward the second end 164".

Referring back to FIG. 2, in use, the two rolled ends 6 and 12 are abutted against one another. The coupling A is placed over the rolled ends 6 and 12. The groove 40 or aligning device is aligned with the joint 14. The handle mechanism 60, 90 is closed so that the groove 40 can urge the cushion 42 into the joint 14 to fill the gap 24 as much as possible.

Figure 8:
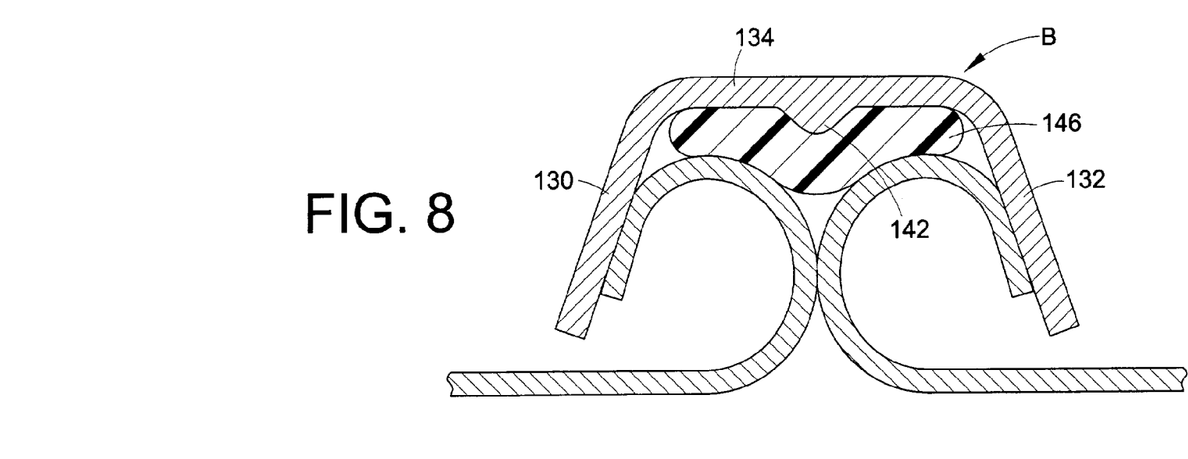
FIG. 8 is a schematic cross-sectional view of a coupling according to another embodiment of the present invention mounted on the pipe ends of FIG. I; and, FIG. 9 is a top plan view of an embodiment of a coupling according to still another embodiment of the present invention, wherein a groove in the apex wall is discontinuous.

Referring now to FIG. 8, an alternate embodiment of a coupling assembly B according to the present invention is there illustrated. In this embodiment, the coupling assembly includes a first lateral wall 130, a second lateral wall 132 and an apex wall 134 spanning and connecting the lateral walls. In this embodiment, however, an inner surface of the apex wall includes a protrusion 142, without a complementary groove being formed on an outer surface thereof. Such a coupling can be formed by extrusion or machining of a known metal. It can also be formed of a suitable thermoplastic or composite material, if desired. In this embodiment, the protrusion 142 still urges a cushion 146 into a gap between the adjoining pipe ends. The protrusion 142 is shown as being somewhat rounded or V-shaped in cross-section, however the protrusion could have any desired shape.

Figure 9:
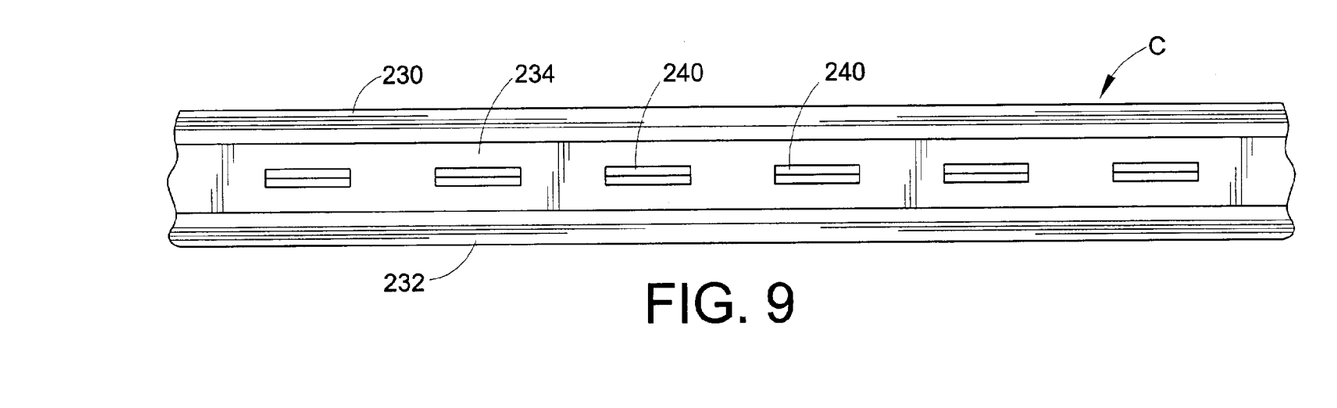

Referring now to FIG. 9, an embodiment of a coupling according to another embodiment of the coupling assembly is there shown. In this embodiment the coupling assembly includes lateral walls 230 and 232 that are interconnected by an apex wall 234. In this embodiment, a discontinuous groove 240 is formed in the apex wall 234.

In addition to the embodiment depicted in FIG. 9, the protrusion 142 of FIG. 8 can also be discontinuous. Accordingly, the protrusion or groove described above need only urge a portion of the cushion or gasket toward the joint formed between the pipes.

The invention has been described with reference to the preferred embodiments. Obviously, modifications and alterations will occur to others upon reading and understanding the preceding detailed description. It is intended to include all such modifications and alterations in so far as they come within the scope of the appended claims or the equivalents thereof.

What is claimed is:

1. A pipe coupling assembly for joining two pipe ends, the assembly comprising:
   an apex wall;
   a first lateral wall depending at an obtuse angle from the apex wall;
   a second lateral wall depending at an obtuse angle from the apex wall, the apex wall and the lateral walls defining a channel;
   a gasket disposed in the channel and contacting an inner surface of the apex wall and a major portion of at least one of the lateral walls prior to tightening the coupling assembly around two pipe ends; and
   a protrusion on the apex wall extending into the channel.

2. The assembly of claim 1, wherein the lateral walls have a length that is shorter than a cross-sectional width of the apex wall.

3. The assembly of claim 1, further comprising a handle attached to the apex wall.

4. A coupling assembly for joining two pipe ends each having a rolled bead at its end, the assembly comprising:

an apex wall having an inwardly extending circumferential protrusion configured to extend towards a gap formed between two abutting rolled bead ends of two abutting pipes;

a first lateral wall depending from said apex wall;

a second lateral wall depending from said apex wall; and a cushion contacting a lower surface of the apex wall and disposed between the first and second lateral walls, wherein the protrusion positions a central portion of the cushion at a different cross-sectional elevation as compared to opposed side portions of the cushion, the cushion central portion extending into the gap upon tightening of the assembly.

5. The assembly of claim 4, wherein the cushion contacts at least one of the first lateral side wall and the second lateral side wall prior to tightening of the assembly around the pipe ends.

6. The assembly of claim 4, wherein the protrusion is discontinuous.

7. The assembly of claim 4, wherein the apex wall has a width greater than a length of each of the lateral walls.

8. A pipe coupling assembly for joining two pipe ends each having a rolled bead at its end, the assembly comprising:

an apex wall having a cross-sectional width;

a first lateral wall extending at an obtuse angle from the apex wall in a first direction;

a second lateral wall extending at an obtuse angle from the apex wall in the first direction wherein the lateral walls each have a length that is shorter than the cross-sectional width of the apex wall;

a gasket mounted to an inner surface of the apex wall; and a protrusion on the apex wall, wherein the protrusion extends in the first direction towards a gap formed between two abutting rolled bead ends of two abutting pipes.

9. The assembly of claim 8, wherein the gasket contacts at least one of the first lateral side wall and the second lateral side wall prior to tightening of the assembly around the pipe ends.

10. The assembly of claim 8, further comprising a handle attached to the apex wall.

11. The assembly of claim 10, wherein the handle comprises a portion of an over center locking mechanism.

* * * * *